(12) United States Patent
Umeda

(10) Patent No.: US 10,134,073 B2
(45) Date of Patent: Nov. 20, 2018

(54) INFORMATION PROCESSING DEVICE, CATEGORY DISPLAYING METHOD, PROGRAM, AND INFORMATION STORAGE MEDIUM

(71) Applicant: Rakuten, Inc., Shinagawa-ku, Tokyo (JP)

(72) Inventor: Takashi Umeda, Tokyo (JP)

(73) Assignee: Rakuten, Inc., Tokyo (JP)

( * ) Notice: Subject to any disclaimer, the term of this patent is extended or adjusted under 35 U.S.C. 154(b) by 857 days.

(21) Appl. No.: 14/367,239

(22) PCT Filed: Feb. 28, 2013

(86) PCT No.: PCT/JP2013/055422
§ 371 (c)(1),
(2) Date: Jun. 20, 2014

(87) PCT Pub. No.: WO2014/020928
PCT Pub. Date: Feb. 6, 2014

(65) Prior Publication Data
US 2014/0351094 A1    Nov. 27, 2014

(30) Foreign Application Priority Data
Jul. 31, 2012 (JP) .................................. 2012-170284

(51) Int. Cl.
*G06F 17/30* (2006.01)
*G06Q 30/06* (2012.01)
(Continued)

(52) U.S. Cl.
CPC ....... *G06Q 30/0625* (2013.01); *G06F 3/0482* (2013.01); *G06F 3/04842* (2013.01); *G06Q 30/0641* (2013.01)

(58) Field of Classification Search
None
See application file for complete search history.

(56) References Cited

U.S. PATENT DOCUMENTS 6,246,998 B1   6/2001  Matsumori
7,395,222 B1 * 7/2008  Sotos .................... G06Q 10/10
                                                   705/7.29
(Continued)

FOREIGN PATENT DOCUMENTS

JP    H08-255150 A     10/1996
JP    2001-147932 A    5/2001
(Continued)

OTHER PUBLICATIONS

Silberschatz, Abraham, et al. "Operating system concepts. 8th ed.". John Wiley & Sons. Published Jul. 28, 2008. ISBN: 978-0-470-12872-5. Retrieved Aug. 2017.*
(Continued)

*Primary Examiner* — Neveen Abel Jalil
*Assistant Examiner* — Irene Baker
(74) *Attorney, Agent, or Firm* — HEA Law PLLC

(57) ABSTRACT

Users are enabled to select a category with more ease than in the past. An information processing device estimates, for a target category that is one of a plurality of categories which have a tree structure including a plurality of hierarchy levels and to each of which one or more objects belong, whether a user is knowledgeable about categories below the target category, based on an input from the user, and controls whether or not display means displays the categories below the target category, based on whether or not the user is estimated as being knowledgeable about the categories below the target category.

15 Claims, 11 Drawing Sheets

(51) Int. Cl.
    *G06F 3/0482*     (2013.01)
    *G06F 3/0484*     (2013.01)

(56) References Cited

U.S. PATENT DOCUMENTS

| | | | |
|---|---|---|---|
| 8,249,885 B2* | 8/2012 | Berkowitz | G06F 17/30873 |
| | | | 705/1.1 |
| 9,194,716 B1* | 11/2015 | Cutter | G01C 21/3679 |
| 2006/0288311 A1 | 12/2006 | Heer et al. | |
| 2007/0226082 A1 | 9/2007 | Leal | |
| 2009/0024409 A1* | 1/2009 | Steelberg | G06Q 10/103 |
| | | | 705/301 |
| 2010/0088331 A1* | 4/2010 | White | G06F 17/30867 |
| | | | 707/759 |
| 2011/0022606 A1* | 1/2011 | Mason | G06F 17/30867 |
| | | | 707/748 |

FOREIGN PATENT DOCUMENTS

| | | |
|---|---|---|
| JP | 2002-183163 A | 6/2002 |
| JP | 2011-170699 A | 9/2011 |
| WO | 00/00884 A1 | 1/2000 |

OTHER PUBLICATIONS

Čisar et al. "EWMA Algorithm in Network Practice". 2010. Int. J. of Computers, Communications & Control, ISSN 1841-9836, E-ISSN 1841-9844, vol. V (2010), No. 2, pp. 160-170. Accessed Apr. 2018.*
Office Action dated Jul. 22, 2016 for corresponding EP application No. 13826420.5.

* cited by examiner

FIG.4

| FIRST HIERARCHY LEVEL | SECOND HIERARCHY LEVEL | THIRD HIERARCHY LEVEL | FOURTH HIERARCHY LEVEL |
|---|---|---|---|
| SHOES | WOMEN'S SHOES | BOOTS | MOUTON |
| | | | SHORT |
| | | SNEAKERS | |
| | | PUMPS | ROUND TOE |
| | | | OPEN TOE |
| | | ⋮ | |
| | MEN'S SHOES | SNEAKERS | |
| | | BUSINESS SHOES | |
| | | SANDALS | |
| | | OTHER SHOES | |
| HOME ELECTRIC APPLIANCES/ PERSONAL COMPUTERS | SMARTPHONES /TABLETS | | |
| | PERSONAL COMPUTERS | TABLET PCs | |
| | | ULTRABOOKS | |
| | | NETBOOKS | |
| | HOME ELECTRIC APPLIANCES | | |

FIG.5

| MERCHAN-DISE ID | MERCHAN-DISE NAME | BRAND | CATEGORY |
|---|---|---|---|
| S0001 | AAA BOOTS | Aaa | SHOES > WOMEN'S SHOES > BOOTS > SHORT |
| S0002 | BBB PUMPS | Bcd | SHOES > WOMEN'S SHOES > PUMPS > ROUND TOE |
| M0003 | M01 | Cde | HOME ELECTRIC APPLIANCES > PERSONAL COMPUTERS > ULTRABOOKS > ACCESSORIES |

FIG.7
SEARCH KEYWORD [HEEL 3cm]  [RE-SEARCH]
NARROW DOWN BY CATEGORY
WOMEN'S SHOES
 PUMPS
  ROUND TOE
  OPEN TOE
   ．
   ．
   ．
<SEARCH RESULT>
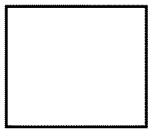   BBB PUMPS
          SHOP : A Shop
   BDE
          SHOP : A Shop
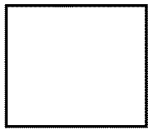   COMFORT PUMPS
          SHOP : B Shop
   ．
   ．
   ．
"WOMEN'S SHOES" HOT SELLER RANKING
| FIRST PLACE | 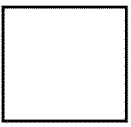 | SECOND PLACE | 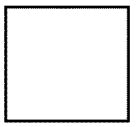 | THIRD PLACE | 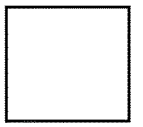 |

FIG.9

| USER ID | MERCHAN-DISE ID | CATEGORY | VIEWED DATE/TIME |
|---|---|---|---|
| user1 | S0001 | SHOES > WOMEN'S SHOES > BOOTS > SHORT | 4/1/2012 13:00 |
| user1 | S1102 | SHOES > WOMEN'S SHOES > BOOTS > SHORT | 4/1/2012 13:05 |
| user1 | S0002 | SHOES > WOMEN'S SHOES > PUMPS > ROUND TOE | 4/15/2012 9:10 |

FIG.10

| USER ID | MERCHAN-DISE ID | CATEGORY | PURCHASED DATE/TIME |
|---|---|---|---|
| user1 | S0001 | SHOES > WOMEN'S SHOES >BOOTS > SHORT | 4/1/2012 13:30 |

FIG.11

| | USER ID | MERCHAN-DISE ID | CATEGORY |
|---|---|---|---|
| 1 | user1 | S0002 | SHOES > WOMEN'S SHOES > PUMPS > ROUND TOE |
| 2 | user2 | S5010 | STORAGE FURNITURE > STORAGE FOR LIVING ROOM > LOW SIDEBOARDS > FOR TELEVISION SET |

FIG.12

| USER ID | MERCHAN-DISE ID | CATEGORY | TYPE | CLICKED DATE/TIME | PURCHASED /NOT PURCHASED |
|---|---|---|---|---|---|
| user1 | M0003 | HOME ELECTRIC APPLIANCES > PERSONAL COMPUTERS >NOTEBOOK PCs > NOTEBOOK PCs MAIN BODY | RANKING | 9/1/2011 13:00 | PURCHASED |
| user1 | K0010 | TOYS > EDUCATIONAL TOYS> BLOCKS > OTHERS | ADVER-TISEMENT | 12/1/2011 9:00 | PURCHASED |

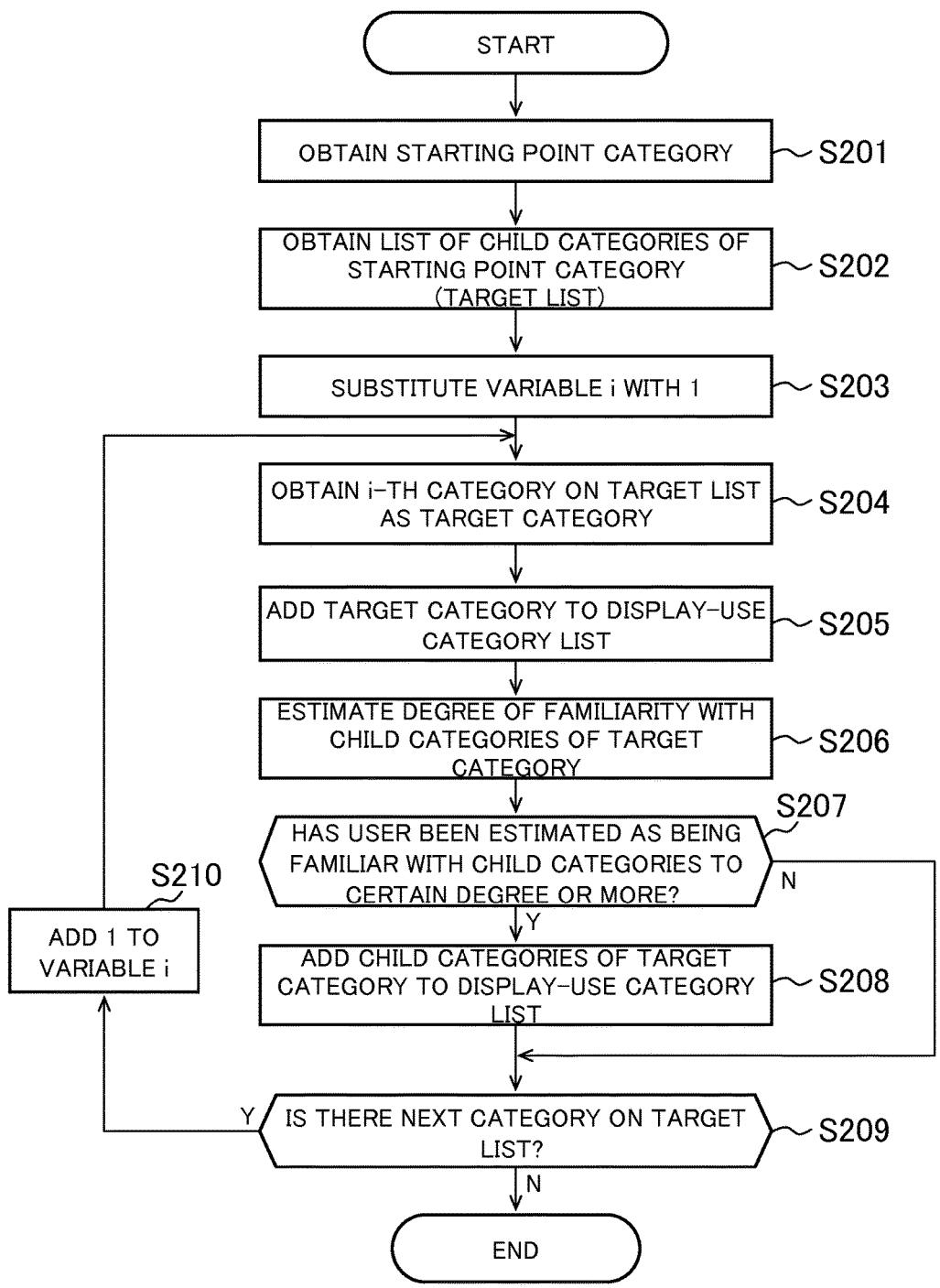

FIG.17

| FIRST HIERARCHY LEVEL | MERCHAN-DISE COUNT | SECOND HIERAR-CHY LEVEL | MERCHAN-DISE COUNT | THIRD HIERARCHY LEVEL | MERCHAN-DISE COUNT | FOURTH HIERARCHY LEVEL | MERCHAN-DISE COUNT |
|---|---|---|---|---|---|---|---|
| SHOES | 40 | WOMEN'S SHOES | 30 | BOOTS | 2 | MOUTON | 1 |
| | | | | | | SHORT | 1 |
| | | | | SNEAKERS | 0 | | |
| | | | | PUMPS | 15 | ROUND TOE | 10 |
| | | | | | | OPEN TOE | 0 |
| | | MEN'S SHOES | 5 | SNEAKERS | 0 | | |
| | | | | BUSINESS SHOES | 1 | | |
| | | | | SANDALS | 1 | | |
| | | | | OTHER SHOES | 1 | | |

INFORMATION PROCESSING DEVICE, CATEGORY DISPLAYING METHOD, PROGRAM, AND INFORMATION STORAGE MEDIUM

CROSS REFERENCE TO RELATED APPLICATIONS

This application is a National Stage of International Application No. PCT/JP2013/055422 filed Feb. 28, 2013, claiming priority based on Japanese Patent Application No. 2012-170284 filed on Jul. 31, 2012. The contents of each of the above documents are incorporated herein by reference in their entirety.

TECHNICAL FIELD

The present invention relates to an information processing device, a category displaying method, a program, and an information storage medium.

BACKGROUND ART

In electronic commerce and other similar systems where merchandise or the like is presented to users over a network, merchandise or the like is classified into hierarchized categories so that a particular piece of merchandise can be found with the use of the categories. Patent Literature 1 discloses a shopping mall system in which merchandise is classified into categories having a plurality of hierarchy levels to be used when the search is conducted for merchandise.

CITATION LIST

Patent Literature

[Patent Literature 1] JP 2002-183163 A

SUMMARY OF INVENTION

Technical Problem

Examples of how the categories are displayed include a method that repeats displaying only categories on a particular hierarchy level at first and, once a user selects a category, displaying categories below the selected category, and a method in which a list of categories on a plurality of hierarchy levels which is created in advance is displayed. The former method requires selecting categories always from the upper hierarchy levels downward, which makes the category selecting operation laborious. With the latter method, on the other hand, the user may feel at a loss about which category to choose when many categories unfamiliar to the user are displayed. As a result of these, finding a desired piece of merchandise or the like is made difficult.

The present invention has been made in view of the problem described above, and an object of the present invention is therefore to provide a technology that lessens a user's trouble of finding a desired piece of merchandise or the like than in the past.

Solution to Problem

In order to solve the above-mentioned problem, an information processing device according to one embodiment of the present invention includes: estimation means for estimating, for a target category that is one of a plurality of categories which have a tree structure including a plurality of hierarchy levels and to each of which one or more objects belong, a user's degree of familiarity with categories below the target category, based on an input from the user; and display control means for controlling whether or not display means displays the categories below the target category, based on a result of the estimation made by the estimation means.

Further, a category displaying method according to one embodiment of the present invention includes the steps of: estimating, for a target category that is one of a plurality of categories which have a tree structure including a plurality of hierarchy levels and to each of which one or more objects belong, a user's degree of familiarity with categories below the target category, based on an input from the user; and controlling whether or not display means displays the categories below the target category, based on the user's degree of familiarity estimated based on the input from the user.

Further, a program according to one embodiment of the present invention controls a computer so that the computer functions as: estimation means for estimating, for a target category that is one of a plurality of categories which have a tree structure including a plurality of hierarchy levels and to each of which one or more objects belong, a user's degree of familiarity with categories below the target category, based on an input from the user; and display control means for controlling whether or not display means displays the categories below the target category, based on a result of the estimation made by the estimation means.

According to the present invention, a user's trouble of finding a desired object is lessened than without the configuration of the present invention.

In one embodiment of the present invention: each of the one or more objects may belong to one of lowest categories and to a plurality of categories above the one of the lowest categories; the information processing device may further include search result obtaining means for obtaining a plurality of objects that are found as a result of a search conducted by search means based on search criteria that are input by the user; and based on a value that indicates a fluctuation in a count of found objects for each of the plurality of categories below the target category, the estimation means may estimate the user's degree of familiarity with the plurality of categories below the target category.

It can be considered that a user is more likely to be capable of setting appropriate search criteria and familiar with lower categories when the fluctuation in object count is smaller. Therefore, according to this embodiment, a user's degree of familiarity with categories below the target category can be estimated.

In one embodiment of the present invention, based on a count of categories which are below the target category and to each of which a count of found objects belongs exceed a given cutoff threshold, the estimation means may estimate the user's degree of familiarity with the categories below the target category.

In one embodiment of the present invention, a proportion of the obtained count of objects to a count of objects found through a search as ones belonging to the target category may be calculated, and, based on a count of categories which are below the target category and to each of which a ratio of a count of found objects belongs divided by a count of found objects belongs to the target category exceed a given cutoff ratio, the estimation means may estimate the user's degree of familiarity with the categories below the target category.

In one embodiment of the present invention, the estimation means may tally, for each of a plurality of categories below the target category, a count of objects that belong to the each of the plurality of categories, and, based on variance of the count of objects among the plurality of categories below the target category, the estimation means may estimate the user's degree of familiarity with the plurality of categories below the target category.

In one embodiment of the present invention, the estimation means may estimate the user's degree of familiarity with the plurality of categories below the target category based on a degree of change of a second value from a first value; the first value may indicate a fluctuation in a count of objects which belongs to each of the plurality of categories below the target category and which are found by the search means based on search criteria that are input by the user; the second value may indicate a fluctuation in a count of objects which belongs to each of the plurality of categories below the target category and which are found by the search means based on next search criteria that are input by the user.

It is estimated that a user who has conducted a search and the next search is capable of setting search criteria appropriately when the fluctuation in the next search is significantly reduced from the fluctuation in the preceding search. Therefore, according to this embodiment, a user's degree of familiarity with categories below the target category can be estimated.

In one embodiment of the present invention: each of the one or more objects may belong to one of lowest categories out of the plurality of categories, and to a plurality of categories above the one of the lowest categories; and the estimation means may estimate the user's degree of familiarity with categories below the target category based on at least some of: objects of which details are output by detail displaying means to the user; objects purchased by the user via purchasing means; and objects registered in a list of objects that are to be viewed later by the user, out of objects that belong to the target category.

A user who accesses a category or a piece of merchandise more frequently can be considered as more knowledgeable about the category or the piece of merchandise. Therefore, according to this embodiment, a user's degree of familiarity with categories below the target category can be estimated.

In one embodiment of the present invention, the estimation means may estimate the user's degree of familiarity with categories below the target category based on at least some of: objects of which details are output by the detail displaying means to the user; objects purchased by the user via the purchasing means; and objects registered in a list of objects that are to be viewed later by the user, out of the objects that belong to the target category and that are not suggested to the user by presenting means.

In one embodiment of the present invention, the estimation means may estimate the user's degree of familiarity with categories below the target category based on at least some of: objects of which details are output by the detail displaying means to the user; objects purchased by the user via the purchasing means; and objects registered in a list of objects that are to be viewed later by the user, out of objects that belong to the target category and that have fewer reviews written by other users than a review count threshold.

In one embodiment of the present invention: the plurality of objects may be pieces of merchandise; and the estimation means may estimate the user's degree of familiarity with categories below the target category based on a count of brand types of at least some of: objects of which details are output by the detail displaying means to the user; objects purchased by the user via the purchasing means; and objects registered in a list of objects that are to be viewed later by the user, out of objects that belong to the target category.

A user who selects a piece of merchandise based on evaluations or recommendations of others, or a user who purchases only articles of a particular brand, is more likely than not to be unknowledgeable about the piece of merchandise and relevant categories. Therefore, according to this embodiment, a user's degree of familiarity with categories below the target category can be estimated more precisely.

In one embodiment of the present invention, the estimation means may estimate the user's degree of familiarity with categories below the target category based on a count of objects of which details are output to the user, a count of objects purchased by the user, and a count of objects registered in a list of objects that are to be viewed later by the user, out of objects that belong to the target category, and a judgment threshold which is set for each target category.

According to this embodiment, estimation can be made depending on a difference in a user's mode of access such as commodities and expensive articles.

In one embodiment of the present invention: the estimate means may calculate a first value which indicates a fluctuation in a count of found objects which belongs to each of the plurality of categories below the target category, the estimate means may calculate a second value which indicates a user's degree of use of objects that belong to the target category based on a first count, a second count, and a third count, the first count, the second count, and the third count respectively being a count of objects of which details are output to the user, a count of objects purchased by the user, and a count of objects registered in a list of objects that are to be viewed later by the user, out of the objects that belong to the target category, and the estimation means may estimate the user's degree of familiarity with the plurality of categories below the target category based on a value that is obtained by adding the first value and the second value by weighted addition; and, in the weighted addition of the first value and the second value, the estimation means may weight the second value heavier when the first count of objects, the second count of objects, or the third count of objects out of the objects that belong to the target category is larger.

In one embodiment of the present invention, the user's degree of familiarity with categories below the target category may be estimated based on lengths of reviews input by the user about at least some of objects that belong to the target category.

A user who describes an object such as a piece of merchandise is more likely to be knowledgeable about the object and relevant categories when the description is longer. Therefore, according to this embodiment, a user's degree of familiarity with categories below the target category can be estimated.

In one embodiment of the present invention, the display control means may control the display means so that categories below the target category are displayed when the user's degree of familiarity with the categories below the target category that is estimated by the estimation means is equal to or more than a given degree.

In one embodiment of the present invention, the display control means may limit the displaying of categories below the target category by the display means when the user's degree of familiarity with the categories below the target category that is estimated by the estimation means is less than a given degree.

In one embodiment of the present invention: for each of a plurality of target categories that are on one of the plurality of hierarchy levels, the estimation means may estimate the user's degree of familiarity with categories below the each of the plurality of target categories based on an input from the user; and the display control means may allow the display means to display categories below each target category for which the user's degree of familiarity with the lower categories is estimated to be equal to or more than a given degree, and may forbid the display means to display categories below each target category for which the user's degree of familiarity with the lower categories is estimated to be less than the given degree.

BRIEF DESCRIPTION OF DRAWINGS

FIG. 4 is a diagram illustrating an example of the hierarchical structure of categories.

FIG. 5 is a diagram illustrating an example of a merchandise database.

FIG. 7 is a diagram illustrating an example of a merchandise list screen.

FIG. 9 is a diagram illustrating an example of a viewing history.

FIG. 10 is a diagram illustrating an example of a purchase history.

FIG. 11 is a diagram illustrating an example of a user's favorites list.

FIG. 12 is a diagram illustrating an example of a user's action history with respect to merchandise presented as recommended ones.

FIG. 13 is a diagram illustrating an example of a processing flow of a category display control unit.

FIG. 17 is a diagram illustrating an example of a merchandise count that is tallied for each category with respect to a search result.

DESCRIPTION OF EMBODIMENTS

An embodiment of the present invention is described below with reference to the drawings. Redundant descriptions on components denoted by the same reference symbols are omitted. Described below is an electronic commerce system in which pieces of merchandise belong to categories.

Figure 1:
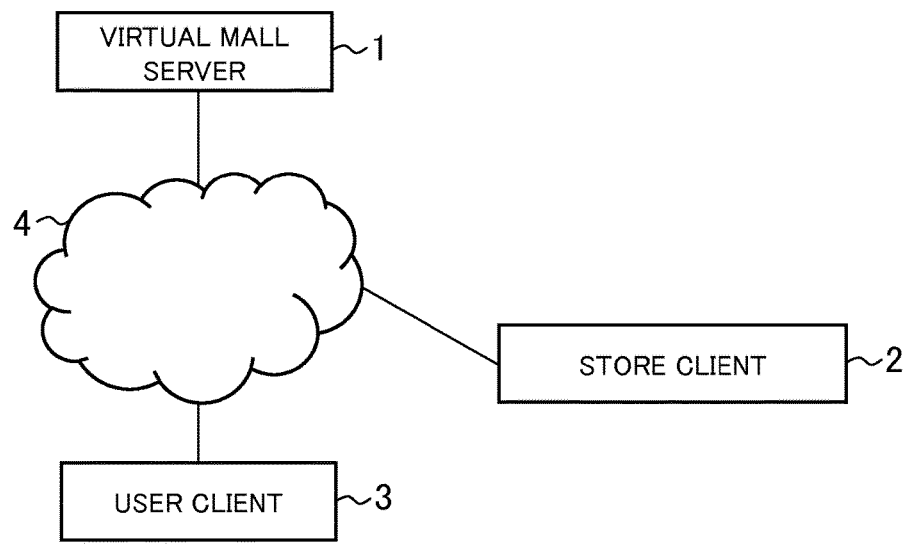
FIG. 1 is a diagram illustrating an example of the configuration of an electronic commerce system according to an embodiment of the present invention.

FIG. 1 is a diagram illustrating an example of the configuration of an electronic commerce system according to the embodiment of the present invention. The electronic commerce system includes a virtual mall server 1, a store client 2, and a user client 3. These are connected via the Internet 4, which is a type of a network. The following description focuses on a case where this electronic commerce system uses Web technologies. The electronic commerce system may instead be of, for example, a client-server type in which a dedicated application is installed in the user client 3.

The virtual mall server 1 is a server for implementing functions of a store that participates in electronic business transactions. More specifically, the virtual mall server 1 implements a virtual mall made up of a plurality of electronic stores, and provides a merchandise search function, a merchandise introduction function, a payment/logistics assistance function, and the like. The store client 2 is a client through which an store operator running a store that is a part of the virtual mall accesses the virtual mall server 1, and is a personal computer, for example. Through the store client 2, the store operator updates a merchandise database, which is stored in the virtual mall server 1, and obtains information on merchandise purchased by users. The user client 3 is a computer operated by a user, for example, a personal computer or a mobile terminal.

Figure 2:
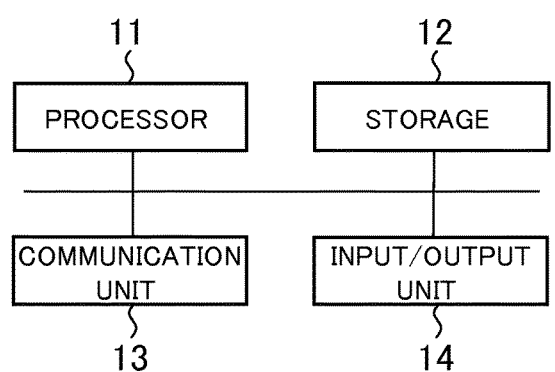
FIG. 2 is a diagram illustrating an example of the hardware configuration of a virtual mall server.

FIG. 2 is a diagram illustrating an example of the hardware configuration of the virtual mall server 1. The virtual mall server 1 includes a processor 11, storage 12, a communication unit 13, and an input/output unit 14. The virtual mall server 1 is, for example, a server computer set up in a data center.

The processor 11 operates in accordance with a program stored in the storage 12. The processor 11 controls the communication unit 13 and the input/output unit 14. The program may be provided via a network such as the Internet 4, or may be provided stored in a computer-readable storage medium such as a DVD-ROM.

The storage 12 includes a memory element such as a RAM or a flash memory, a hard disk drive, and the like. The storage 12 stores the program described above. The storage 12 also stores information and computation results that are input from the respective units.

The communication unit 13 implements a function of holding communication to/from other devices such as the user client 3, and includes, for example, an integrated circuit that constitutes a wired LAN, or a network card having a communication terminal. The communication unit 13 inputs information received from another device to the CPU 11 or the storage 12, and transmits information to another device, under control of the CPU 11.

The input/output unit 14 is a circuit for communicating with a display output device and an input device by data, and includes, for example, a graphic board which outputs an image to a display output device, and a USB controller which obtains data from an input device such as a keyboard and/or a mouse, among others. The input/output unit 14 outputs image data or the like to a display output device, and obtains information input by an operator (user) from an input device, under control of the processor 11.

Figure 3:
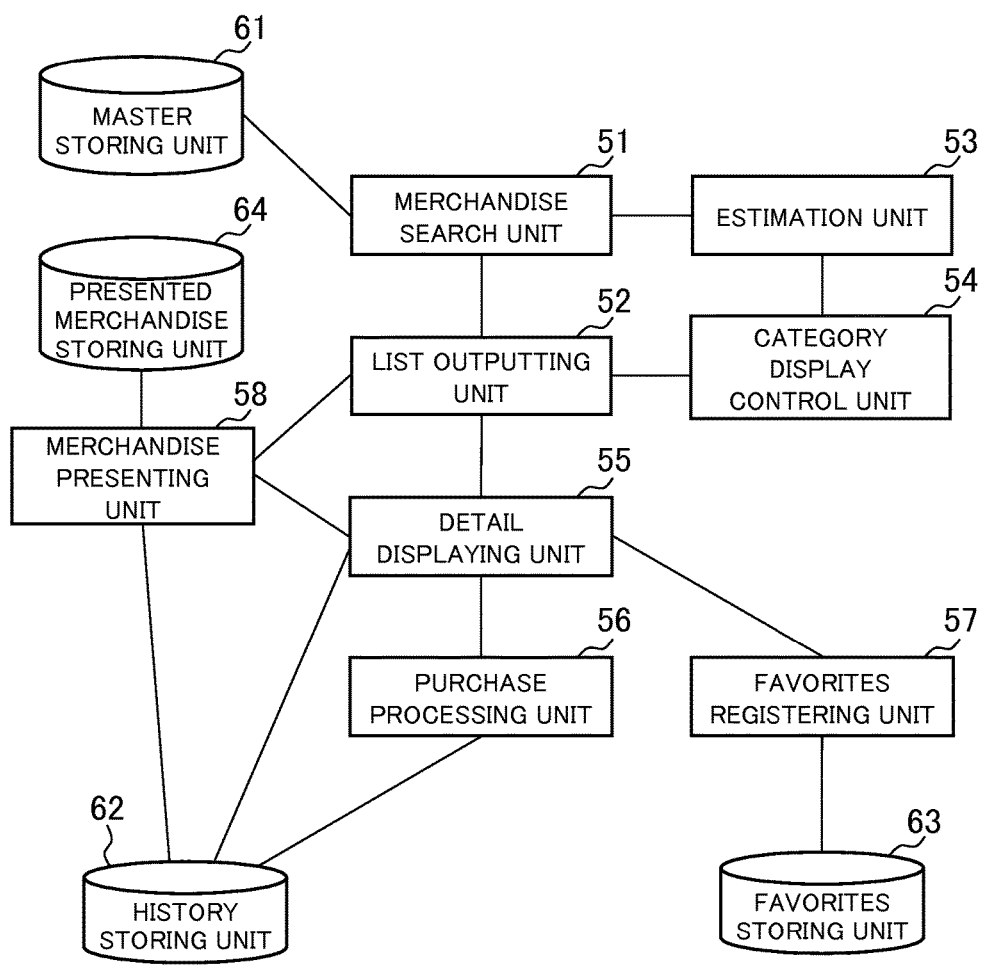
FIG. 3 is a function block diagram illustrating functions that are implemented by the virtual mall server.

FIG. 3 is a function block diagram illustrating functions that are implemented by the virtual mall server 1. In terms of functions, the virtual mall server 1 includes a merchandise search unit 51, a list outputting unit 52, an estimation unit 53, a category display control unit 54, a detail displaying unit 55, a purchase processing unit 56, a favorites registering unit 57, a merchandise presenting unit 58, a master storing unit 61, a history storing unit 62, a favorites storing unit 63, and a presented merchandise storing unit 64. These functions are implemented by the processor 11 by executing the program stored in the storage 12 to control the communication unit 13 and others. The master storing unit 61, the history storing unit 62, the favorites storing unit 63, and the presented merchandise storing unit 64 are implemented mainly by the storage 12 of the virtual mall server 1, but may instead be implemented by a database management system that is included in another server.

The master storing unit 61 stores a category database and a merchandise database. The category database includes a plurality of records each of which corresponds to one category. Items included in each record are a category ID, a category name, and a parent category ID. The category of one record is a child category of a category that is indicated by the parent category ID. A category set represented by the category database has a tree structure made up of a plurality of hierarchy levels. In the tree structure, one or more child categories branch from one parent category.

FIG. 4 is a diagram illustrating an example of the hierarchical structure of categories. Some of the categories are omitted from FIG. 4 in order to simplify the description. For instance, while only three of categories that are one hierarchical level below a category "women's shoes" have their names written in FIG. 4, there are actually other categories which are not shown in the drawing. Blank fields also contain a plurality of categories in actuality.

FIG. 5 is a diagram illustrating an example of the merchandise database. The merchandise database includes a plurality of records created for the respective pieces of merchandise. Each record includes a merchandise ID, a merchandise name, a brand, categories to which the piece of merchandise belongs, and information describing the piece of merchandise. Each piece of merchandise belongs to one of the lowest categories and to categories above that category. In the example of FIG. 5, a piece of merchandise "AAA boots" belongs to a category "short" and to its upper categories "shoes", "women's shoes", and "boots".

The history storing unit 62 stores a purchase history, a viewing history, an action history, and the like. The favorites storing unit 63 stores a favorites list. The presented merchandise storing unit 64 stores pieces of merchandise that are presented by the merchandise presenting unit 58, in the form of a category-based ranking chart and in association with users' characteristics. Details of these pieces of information are described below.

Figure 6:
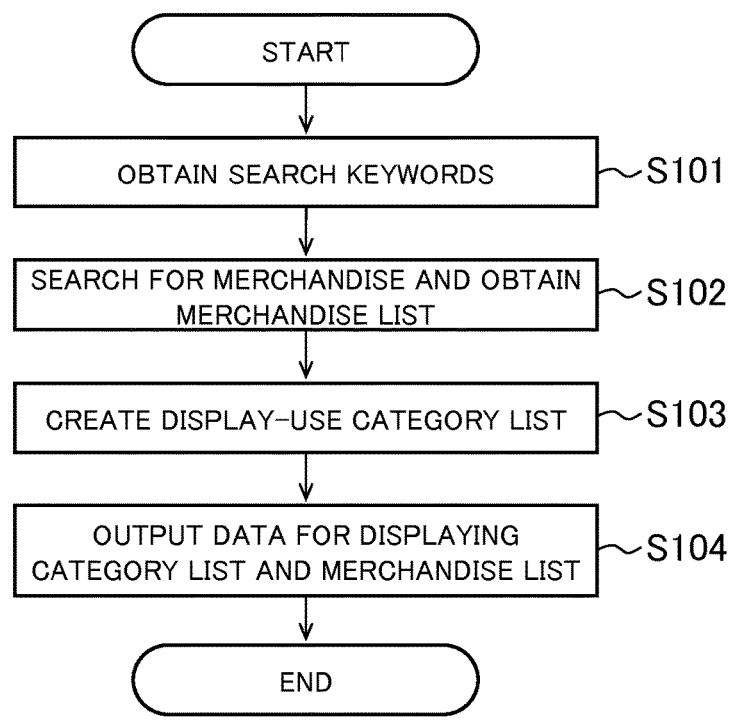
FIG. 6 is a diagram illustrating a schematic processing flow of a merchandise searching unit and a list outputting unit.

The following description is given on the functions that are implemented by the virtual mall server 1 with reference to processing flows and screens displayed on the user client 3. FIG. 6 is a diagram illustrating a schematic processing flow of the merchandise search unit 51 and the list outputting unit 52.

The merchandise search unit 51 is implemented mainly by the processor 11, the storage 12, and the communication unit 13. The merchandise search unit 51 obtains search criteria including search keywords for a merchandise search that are input by a user (Step S101). More specifically, the merchandise search unit 51 transmits data of a search keyword inputting screen to the user client 3. The user client 3 displays the search keyword inputting screen based on the data so as to transmit to the merchandise search unit 51 search criteria such as search keywords that are input on the screen by the user. The merchandise search unit 51 obtains the transmitted search criteria. Categories of a particular layer that is a search target may be obtained as other search criteria than search keywords. The merchandise search unit 51 next searches the merchandise database for pieces of merchandise that satisfy the obtained search criteria, and obtains a merchandise list, which is a list of pieces of merchandise that are found through the search (Step S102). More specifically, the merchandise search unit 51 obtains, from the merchandise database, records that include a search keyword in their merchandise names or merchandise descriptions, and obtains as a merchandise list a plurality of pieces of merchandise indicated by the records (specifically, merchandise IDs or the like).

The category display control unit 54 is implemented mainly by the processor 11 and the storage 12. The category display control unit 54 controls which category list is to be displayed on a merchandise list screen and the like. To that end, the category display control unit 54 creates a display-use category list (Step S103). The display-use category list is a category list that is output to the merchandise list screen and a category search screen of the electronic commerce site. Details of the processing of the category display control unit 54 are described later.

The list outputting unit 52 is implemented mainly by the processor 11, the storage 12, and the communication unit 13. The list outputting unit 52 outputs data for displaying the merchandise list screen on display means of the user client 3 (Step S104). The merchandise list screen displays a list of categories that are on a display-use category list and a list of pieces of merchandise found through a search by the merchandise search unit 51.

FIG. 7 is a diagram illustrating an example of the merchandise list screen. The merchandise list screen is provided with a list of pieces of merchandise found through a search by the merchandise search unit 51, a category list, a field for modifying search keywords, and a "re-search" button. When the user selects a category on the category list, the list outputting unit 52 receives information of this operation and outputs data of the merchandise list screen that includes a list of pieces of merchandise narrowed down by the selected category. This merchandise list screen particularly displays a list of pieces of merchandise narrowed down by the selected category among the pieces of merchandise found through a search by the merchandise search unit 51.

The detail displaying unit 55 is implemented mainly by the processor 11, the storage 12, and the communication unit 13. When the user clicks on the merchandise list screen to select a piece of merchandise from the merchandise list, the detail displaying unit 55 obtains the merchandise ID of the selected piece of merchandise from the user client 3, further obtains details of the piece of merchandise from the merchandise database, and outputs data of the merchandise details screen that shows details of the piece of merchandise to the user client 3.

Figure 8:
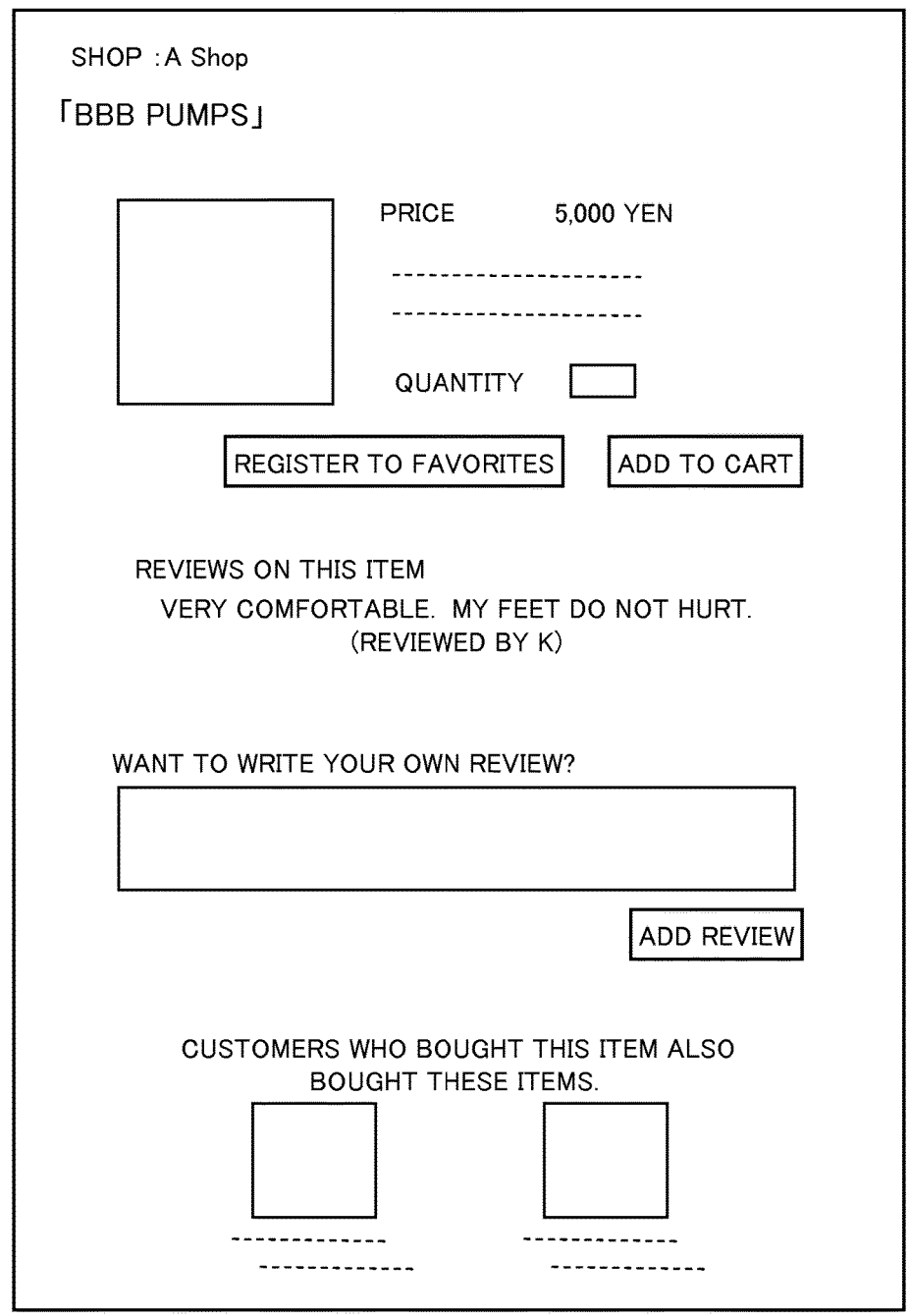
FIG. 8 is a diagram illustrating an example of a merchandise details screen.

FIG. 8 is a diagram illustrating an example of the merchandise details screen. The merchandise details screen contains an image, a price, description, and reviews (evaluations on merchandise) written by other users of a selected piece of merchandise. The merchandise details screen is also provided with an "add to cart" button for advancing purchase processing, an "add to favorites" button for registering to a list of pieces of merchandise that the user wishes to view later (a favorites list), and a field for writing a review.

After outputting data of the merchandise details screen, the detail displaying unit 55 stores in the history storing unit 62 a viewing history that shows a history of the user's viewing of the merchandise details screen. FIG. 9 is a diagram illustrating an example of the viewing history. The detail displaying unit 55 adds to the viewing history a record that includes a viewed date/time, which indicates a date/time when the merchandise details screen has been displayed, a user ID by which the user is identified, a merchandise ID, and categories to which the piece of merchandise belong, each time data of the merchandise details screen is transmitted and the display means of the user client 3 displays the screen. The viewing history does not necessarily include category information because categories can be obtained with the use of the merchandise ID and the merchandise database.

The purchase processing unit 56 is implemented mainly by the processor 11, the storage 12, and the communication unit 13. The purchase processing unit 56 advances purchase processing for apiece of merchandise that the user wishes to purchase as operated by the user. For instance, when the user presses the "add to cart" button on the merchandise details screen, the user client 3 transmits this instruction to the purchase processing unit 56, which outputs data of a screen for inputting information necessary for merchandise shipping processing and payment processing, and advances the merchandise shipping processing and the payment processing in accordance with the input information.

The purchase processing unit 56 stores information about pieces of merchandise purchased by a user, about the user, and the like as a purchase history in the history storing unit 62. FIG. 10 is a diagram illustrating an example of the purchase history. The purchase processing unit 56 adds to the purchase history a record that includes a user ID, a merchandise ID, a category, and a purchase date/time each time a user purchases a piece of merchandise and the shipping processing and the payment processing are executed.

The favorites registering unit 57 is implemented mainly by the processor 11, the storage 12, and the communication unit 13. The favorites registering unit 57 adds to the favorites list apiece of merchandise that the user instructs to register as a favorite. The favorites list is provided for each user separately. The favorites registering unit 57 stores the favorites list in the favorites storing unit 63. FIG. 11 is a diagram illustrating an example of the favorites list of one user. Information included in the favorites list are a merchandise ID, categories, and a user ID. When the user gives an instruction to display a "favorites list screen" on a site top page or the like, the virtual server mall 1 transmits data of the favorites list screen for viewing pieces of merchandise that are registered in the favorites list at a glance to the user client 3. The user can also choose to further display the merchandise details screen from this screen.

When the user writes a review on the merchandise details screen, text of the review, a user ID, and a merchandise ID are stored as review information in the master storing unit 61. The review information is displayed on the merchandise details screen or the like when another user displays the merchandise details screen of the piece of merchandise in question.

The merchandise presenting unit 58 is implemented mainly by the processor 11 and the storage 12. The merchandise presenting unit 58 determines pieces of merchandise to be suggested to a user. Pieces of merchandise that are determined by the merchandise presenting unit 58 can be ones that rank high in sales quantity, or ones that are likely to be purchased by the user judging from the user's purchase history and viewing history. In the case of the former merchandise, ranking information is generated in advance which organizes pieces of merchandise by popularity by tallying the sales quantity or the like for each category, and the merchandise presenting unit 58 obtains ranking information of a category relevant to the displayed screen (for example, a category used for the narrowing down) so as to determine pieces of merchandise. The merchandise presenting unit 58 then controls the list outputting unit 52 and others so that the determined pieces of merchandise are displayed on the merchandise list screen or a ranking screen in a ranking format. In the case of the latter merchandise, the merchandise presenting unit 58 obtains the characteristics of the user from the user's viewing history and purchase history, and determines pieces of merchandise that are associated with the obtained characteristics as merchandise to be presented. An example of this case is banner advertisement. Alternatively, merchandise to be presented may be determined simply by matching combinations of pieces of merchandise that other users have purchased and the user's purchase history or viewing history, without using information that is stored in the presented merchandise storing unit 64. An example of this is so-called recommendation techniques. The merchandise presenting unit 58 controls the detail displaying unit 55 so that the determined merchandise is presented on the merchandise details screen or the like.

The merchandise presenting unit 58 further obtains the user's action history with respect to merchandise presented to the user as suggested articles, and stores the action history in the history storing unit 62. FIG. 12 is a diagram illustrating an example of a user's action history with respect to merchandise presented as recommended ones. When a user selects a presented piece of merchandise, the merchandise presenting unit 58 adds a record that includes the user's ID, a merchandise ID, categories, a clicked date/time, the type of presentation (ranking, banner advertisement, recommendation, or the like), and whether purchased or not. In the case where the user purchases the piece of merchandise, "purchased" is set in the purchased/not purchased field.

Described below are details of the processing of the category display control unit 54 and the estimation unit 53. The estimation unit 53 is implemented mainly by the processor 11 and the storage 12, and executes processing of estimating the degree of familiarity (the degree of recognition) of a user with categories below one category (the target category) based on the user's input (in particular, the users operation regarding merchandise and the like). Details thereof are described later. The degree of familiarity is obtained for each target category and is not obtained for each lower category here.

FIG. 13 is a diagram illustrating an example of a processing flow of the category display control unit 54. First, the category display control unit 54 obtains a category that serves as the starting point (Step S201). The starting point category is, for example, a category whose hierarchy level has no other categories displayed in a category list that is being displayed. In the example of FIG. 4, when all pieces of merchandise found as a result of a search by the merchandise search unit 51 belong to a category "shoes", for instance, there is no need to display a category "home electric appliances/personal computers", and "shoes" is selected as the starting point category.

The category display control unit 54 next obtains a list of child categories of the starting point category (hereinafter referred to as "target list") (Step S202). In the example given above, a plurality of categories one hierarchy level below the category "shoes", such as categories "men's shoes" and "women's shoes", are obtained as a target list. The category display control unit 54 substitutes 1 to a variable i (Step S203), and begins a loop for generating a display-use category list.

The category display control unit 54 obtains the i-th category on the target list as a target category (Step S204), and adds this target category to the display-use category list (Step S205). Next, the estimation unit 53 estimates the user's degree of familiarity with child categories of the target category (Step S206). This processing of the estimation unit 53 is described later. The following description deals with a case of estimating which of two types of familiarity applies, i.e., whether the user is familiar to a certain degree or more, or less familiar than the certain degree.

When the user is estimated to be familiar with child categories of the target category to a certain degree or more (Y in Step S207), the category display control unit 54 adds the plurality of child categories of the target category to the display-use category list (Step S208). When the user is estimated to be less familiar with child categories of the target category than the certain degree (N in Step S207), the category display control unit 54 skips Step S208. In the case where the target list has the next category (Y in Step S209), the category display control unit 54 then adds 1 to the variable i (Step S210), and repeats Step S204 and subsequent steps.

The category display control unit 54 thus controls whether or not categories one hierarchy level below a target category are to be displayed in a category list that is displayed by the display means of the user client 3 based on the user's degree of familiarity with the lower categories. Specifically, when the user's degree of familiarity with categories which is estimated for one hierarchy level below the target category to a certain degree by the estimation unit 53, the category display control unit 54 controls the display means so that the lower categories are displayed, whereas the category display control unit 54 keeps the display means from displaying the lower categories when the estimated degree of familiarity is less than the certain degree.

Figure 14:
FIG. 14 is a diagram illustrating an example of displaying categories.

FIG. 14 is a diagram illustrating an example of a category list that is displayed by the display means of the user client 3. Illustrated in FIG. 14 is a category list example in which the starting point category is "shoes" and the estimation unit 53 estimates that the user is knowledgeable about categories below "women's shoes". In this example, categories below "women's shoes" such as "boots", "sneakers", and "pumps" are displayed in addition to the categories "women's shoes" and "men's shoes" which are one hierarchy level below "shoes". With categories on deep hierarchy levels displayed only when the categories are likely to be familiar to the user, the fear of making the user feel that accessing lower categories is a bother or, conversely, the fear of displaying so many unfamiliar categories that the user feels at a loss, is reduced, thereby making the user feel comfortable in selecting a category.

Figure 15:
FIG. 15 is a diagram illustrating another example of displaying categories.

FIG. 15 is a diagram illustrating another example of displaying categories. While only the target category and categories one hierarchy level below the target category (categories two hierarchy levels below the starting point category) are displayed in the example given above, if the user is estimated to be knowledgeable about further lower categories, those categories may also be displayed as illustrated in FIG. 15. This processing can be implemented by calling the processing of FIG. 13 recursively so that the processing of FIG. 13 is executed for each target category, instead of executing Step S208. In this case, the caller target category can be set as a starting point category for the called processing at the time the processing is called recursively.

The category display control unit 54 may control displaying categories only when categories one hierarchy level below the target category are on the lowest hierarchy level.

Figure 16:
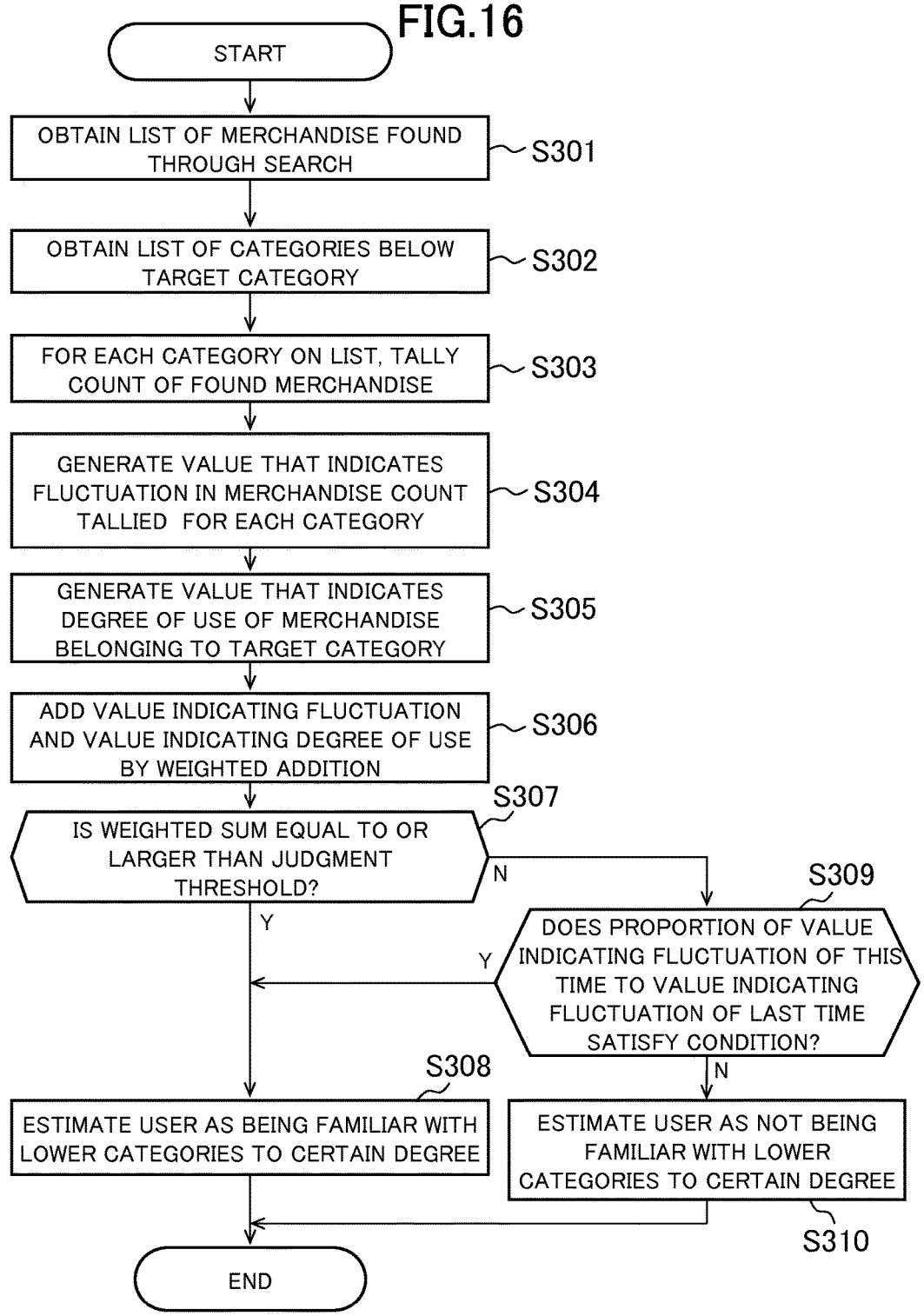
FIG. 16 is a diagram illustrating an example of a processing flow of an estimation unit.

Described below are details of the processing that is executed by the estimation unit 53 in Step S206. FIG. 16 is a diagram illustrating an example of a processing flow of the estimation unit 53. The estimation unit 53 first obtains a list of pieces of merchandise that are found through a search by the merchandise search unit 51 (a search result) (Step S301). The estimation unit 53 next obtains a list of categories one hierarchy level below the target category (Step S302), and tallies, for each category on the obtained category list, the count of found pieces of merchandise that belong to the category (Step S303).

The estimation unit 53 then generates a value that indicates the degree of fluctuation in merchandise count tallied for each category (Step S304). This value is, for example, the proportion (1/N) of categories that satisfy a condition about the merchandise count (the count of these categories is denoted by 1) to categories that are one hierarchy level below the target category (the count of these categories is denoted by N) (1/N). The condition is that the count of found pieces of merchandise that belong to the category in question exceeds a predetermined cutoff threshold, or that the proportion of the count of found pieces of merchandise that belong to categories below the target category to the count of found pieces of merchandise that belong to the target category exceeds a predetermined proportion. The value indicating the degree of fluctuation in this case is larger when the count of categories to each of which more pieces of merchandise than a certain reference belong is higher.

The estimation unit 53 may also use variance of merchandise count counted for each category as the value that indicates the degree of fluctuation.

The estimation unit 53 in this case tallies the count of found pieces of merchandise for each category one hierarchy level below the target category, and uses the tallied merchandise count and the count of the categories to calculate the variance. The value that indicates the fluctuation can be defined by a function of variance values, in particular, a function of which the output is equal to or more than 0 and less than 1 and of which the value is smaller when the fluctuation is bigger.

FIG. 17 is a diagram illustrating an example of a merchandise count that is tallied for each category with respect to a search result. This example is in a case where a search by the name of a brand famous for women's shoes, in particular, pumps, is conducted. In this case, there are many hits on merchandise of the women's shoes category, in particular, the pumps category, whereas there are much fewer hits on merchandise of other categories. Such a distribution is observed when the user succeeds at appropriately narrowing down articles to be searched for, and implies that the probability of the user being familiar with the pumps category below the women's shoes category is high. In the case of an unfamiliar category, on the other hand, the user does not manage to narrow down articles to be searched for well, and the search result distribution among categories is therefore expected to be more dispersed. Based on this idea, the user's degree of familiarity with categories below the target category can be estimated. In FIG. 17, some of categories are omitted and the sum of merchandise counts of child categories is therefore smaller than the merchandise count of their parent category.

The estimation unit 53 next generates, as another index for the user's degree of familiarity with the lower categories, a value that indicates the degree of use of merchandise belonging to the target category (Step S305). The estimation unit 53 calculates the value that indicates the degree of use by using the count of records in the purchase history, the viewing history, and the favorites list that are about pieces of merchandise belonging to the target category. More specifically, the estimation unit 53 obtains records about merchandise of the target category from the user's purchase history and extracts, from the obtained records, records about pieces of merchandise that have been purchased for other reasons than the presentation of the pieces of merchandise by the merchandise presenting unit 58. These can be extracted with the use of the purchased/not purchased field of the user's action history. The count of the types of the merchandise indicated by the extracted records is treated as a purchased merchandise count. The estimation unit 53 similarly obtains records about merchandise of the target category from the viewing history and the favorites list, extracts from the obtained records pieces of merchandise that have been registered to the viewing history, and pieces of merchandise that have been registered to the favorites lists, for other reasons than the presentation of the pieces of merchandise by the merchandise presenting unit 58, and tallies the counts of the types of the extracted pieces of merchandise as a viewing history count and a favorites count, respectively.

A value b which indicates the degree of use is calculated next by the following expression.

$$b=\alpha \times MK + \beta \times ME + \gamma \times MO$$

Represented by MK, ME, and MO are values that take 1 when the purchase history count, the viewing history count, and the favorites count, respectively, are larger than given thresholds, and that take 0 otherwise. Represented by $\alpha$, $\beta$, and $\gamma$ are weighting coefficients. The user's degree of use is expected to become smaller in the order of purchase, favorites list registration, and viewing. It is therefore appropriate to set $\alpha$, $\beta$, and $\gamma$ so that $\alpha > \beta > \gamma$ is satisfied. The given thresholds may be determined for each target category. That way, judgment can be made depending on the difference in characteristics between a category where the purchase count or the like tends to be high (e.g., commodities) and a category where the purchase count or the like tends to be low (home electric appliances).

When the count of the user's obtained history records about the target category is high, it means that the user accesses this category often, and implies that the probability of the user being familiar with categories below the target category is high as well. In addition, the estimation unit 53 tallies a record count by extracting only records about pieces of merchandise that have been purchased or registered for other reasons than the presentation of the pieces of merchandise by the merchandise presenting unit 58. This is because, when the user selects a piece of merchandise suggested by the merchandise presenting unit 58 (merchandise on a ranking, recommended merchandise, or the like), the resultant history record is dependent on reviews of other people and is deemed as unsuitable data for use in estimation of the user's degree of familiarity with categories. For the same reason, a record about a piece of merchandise of which the review count is higher than a threshold (a review count threshold) may be excluded when a record count is tallied.

The value that indicates the degree of use may be set to 0 when the count of the brand types of pieces of merchandise that are included in the purchase history, the viewing history, or the favorites list and that are included in the target category is equal to or lower than a threshold (e.g., 1). This is because some of users who purchase, or view, only articles of a particular brand could be selecting merchandise based solely on the brand name and paying no attention to the categories of the merchandise.

The estimation unit 53 next adds the value a which indicates the fluctuation and the value b which indicates the degree of use by weighted addition (Step S306). The weighted addition is expressed by the following expression.

$$c = S \times a + T \times b$$

Represented by S and T are weighting coefficients. The weighting coefficients S and T may be calculated depending on the purchase history count, the viewing history count, and the favorites count. For instance, S and T may be set so that S becomes smaller while T becomes larger as the sum of the purchase history count, the viewing history count, and the favorites count grows larger. That way, search results are susceptible to temporary influence and the weight of search results on judgment is reduced more as the purchase history count increases, so that the stability of estimation is improved.

When the weighted sum is equal to or larger than a predetermined judgment threshold (Y in Step S307), the estimation unit 53 estimates that the user is familiar with the lower categories to a certain degree or more (Step S308). When the weighted sum is less than the predetermined judgment threshold (N in Step S307), on the other hand, the estimation processing is executed further in Step S309.

In Step S309, a comparison (change) between a value that indicates the fluctuation of the last time and a value that indicates the fluctuation of this time is obtained for the same target category, and whether or not the comparison indicates a decrease in fluctuation that is equal to or more than a given reference is judged. When the comparison indicates a decrease in fluctuation that is equal to or more than the given reference (Y in Step S309), the estimation of Step S308 is executed. When the comparison does not indicate a decrease in fluctuation that is equal to or more than the given reference, it is estimated that the user is less familiar with the lower categories than the certain degree (Step S310). In the case where variance is used as a value that indicates the fluctuation, the comparison indicates a decrease in fluctuation equal to or more than a given reference when, for example, the proportion "the value of the last time/the value of this time" is smaller than 0.6.

Other than the purchase history, the viewing history, and the favorites list, reviews written by the user may be used for the estimation. For instance, the count of pieces of merchandise for which reviews have been written may be additionally used in generating the value that indicates the degree of use. The estimation unit 53 may also estimate that the user is familiar with categories below the target category to a certain degree or more when the review is longer than a threshold. This is because when a user writes a lengthy review, the user is likely to have in-depth knowledge of the piece of merchandise in question, and then is also likely to be very knowledgeable about categories to which the piece of merchandise belongs.

While the value a which indicates the fluctuation and the value b which indicates the degree of use are both used to estimate whether or not the user is familiar with categories below the target category to a certain degree or more in FIG. 16, only one of the two may be used for the estimation. In the case where the value a which indicates the fluctuation and the value b which indicates the degree of use are not added by weighted addition, the value b which indicates the degree of use may be obtained by adding some of or all of the purchase history count, the viewing history count, and the favorites count by weighted addition. Whether the user is knowledgeable about the lower categories can be estimated in this case depending on whether or not the value b is larger than a threshold that is determined for each category. Alternatively, the estimation may be made by simply determining whether or not a threshold is exceeded for one of the purchase history count, the viewing history count, and the favorites count.

The invention described above is applicable to other systems than electronic commerce systems when there are tree-structure categories and objects belonging to the categories. For instance, the invention can be applied to information objects such as cooking recipes or questions.

The invention claimed is:

1. An information processing device, comprising:
at least one processor; and
at least one memory device that stores a plurality of instructions, which when executed by the at least one processor, causes the at least one processor to operate to:
obtain, based on a search criteria input by a user, a plurality of objects that are found as a result of a search with respect to a target category that is one of a plurality of categories which have a tree structure comprising a plurality of hierarchy levels and to each of which one or more objects belong;
calculate, in a first search, one of (a) a first value which is the proportion, to a count of lower categories below the target category, of a count of lower categories which are below the B target category and to each of which a count of found objects belongs exceeds a given cutoff threshold; (b) a first value which is the proportion, to a count of lower categories below the target category, of a count of lower categories which are below the target category and to each of which a ratio of a count of found objects belongs divided by a count of found objects belongs to the target category exceeds a given cutoff ratio; and (c) a first value which is variance of a count of found objects among the plurality of categories below the target category;
calculate, in a second search which is previous to the first search, one of (a) a second value which is the proportion, to a count of lower categories below the target category, of a count of lower categories which are below the target category and to each of which a count of found objects belongs exceeds a given cutoff threshold; (b) a second value which is the proportion, to a count of lower categories below the target category, of a count of lower categories which are below the target category and to each of which a ratio of a count of found objects belongs divided by a count of found objects belongs to the target category exceeds a given cutoff ratio; and (c) a second value which is variance of a count of found objects among the plurality of categories below the target category;
calculate, for the target category, a purchase history count based on a purchase history of the user; calculate, for the target category, a viewing history count based on a viewing history indicating objects of which details are output by detail displaying to the user; calculate, for the target category, a favorites count based on a favorites list in which objects are registered to be viewed later by the user;
calculate a degree of use by an expression $\alpha \times$(the purchase history count)+$\beta \times$(the viewing history count)+$\gamma \times$(the favorites count) where $\alpha$, $\beta$, and $\gamma$ are predetermined weighting coefficients and $\alpha > \beta > \gamma$;
calculate a weighted addition value by an expression $c = S \times$(the first value)+$T \times$(the degree of use), where $S$ and $T$ are predetermined weighting coefficients;
determine whether all of lower categories below the target category is to be displayed or not based on the weighted addition value and a degree of difference between the first value and the second value;
control displays to display all of the categories below the target category, based on the determination,
wherein, in the weighted addition of the first value and the degree of use, the weighting coefficient T is larger when the purchase history count, the viewing history count, or the favorites count out of the objects that belong to the target category is larger,
wherein the weighting coefficient S becomes smaller as the weighting coefficient T becomes larger.

2. The information processing device according to claim 1,
wherein each of the one or more objects belongs to one of lowest categories and to a plurality of categories above the one of the lowest categories.

3. The information processing device according to claim 1, wherein, the degree of use is calculated based on objects of which details are output by the detail displaying to the user; objects purchased by the user; and objects registered in a list of objects that are to be viewed later by the user, out of the objects that belong to the target category and that are not suggested to the user by the information processing device.

4. The information processing device according to claim 1, wherein the degree of use in is calculated based on objects of which details are output by the detail displaying to the user; objects purchased by the user; and objects registered in a list of objects that are to be viewed later by the user, out of objects that belong to the target category and that have fewer reviews written by other users than a review count threshold.

5. The information processing device according to claim 1,
wherein the plurality of objects comprise pieces of merchandise, and
wherein the degree of use is calculated based on a count of brand types of at least some of: objects of which details are output by the detail displaying to the user; objects purchased by the user; and objects registered in a list of objects that are to be viewed later by the user, out of objects that belong to the target category.

6. The information processing device according to claim 1, wherein the degree of use is calculated based on a count of objects of which details are output to the user, a count of objects purchased by the user, and a count of objects registered in a list of objects that are to be viewed later by the user, out of objects that belong to the target category, and a judgment threshold which is set for each target category.

7. The information processing device according to claim 1, wherein the degree of use is estimated based on lengths of reviews input by the user about at least some of objects that belong to the target category.

8. The information processing device according to claim 1, wherein in the controlling, the display is controlled so that all categories below the target category are displayed when the weighted addition value is equal to or more than a given degree.

9. The information processing device according to claim 1, wherein in the controlling, the displaying of all categories below the target category is limited when the weighted addition value is less than a given degree.

10. The information processing device according to claim 8,
wherein, for each of a plurality of target categories that are on one of the plurality of hierarchy levels, the weighted addition value with respect to each category below the each of the plurality of target categories is calculated based on an input from the user, and wherein, in the controlling, the display is allowed to display all categories below each target category for which the weighted addition value with respect to the lower categories is estimated to be equal to or more than a given degree, and forbids the display to display categories below each target category for which the weighted addition value with respect to the lower categories is estimated to be less than the given degree.

11. A category displaying method, comprising the steps of:
obtaining, based on a search criteria input by a user, a plurality of objects that are found as a result of a search with respect to a target category that is one of a plurality of categories which have a tree structure comprising a plurality of hierarchy levels and to each of which one or more objects belong;
calculating, in a first search, one of (a) a first value which is the proportion, to a count of lower categories below the target category, of a count of lower categories which are below the target category and to each of which a count of found objects belongs exceeds a given cutoff threshold; (b) a first value which is the proportion, to a count of lower categories below the target category, of a count of lower categories which are below the target category and to each of which a ratio of a count of found objects belongs divided by a count of found objects belongs to the target category exceeds a given cutoff ratio; and (c) a first value which is variance of a count of found objects among the plurality of categories below the target category;
calculating, in a second search which is previous to the first search, one of (a) a second value which is the proportion, to a count of lower categories below the target category, of a count of lower categories which are below the target category and to each of which a count of found objects belongs exceeds a given cutoff threshold; (b) a second value which is the proportion, to a count of lower categories below the target category, of a count of lower categories which are below the target category and to each of which a ratio of a count of found objects belongs divided by a B count of found objects belongs to the target category exceeds a given cutoff ratio; and (c) a second value which is variance of a count of found objects among the plurality of categories below the target category;
calculating, for the target category, a purchase history count based on a purchase history of the user; calculate, for the target category, a viewing history count based on a viewing history indicating objects of which details are output by detail displaying to the user; calculate, for the target category, a favorites count based on a favorites list in which objects are registered to be viewed later by the user;
calculating a degree of use by an expression $\alpha \times$(the purchase history count)$+\beta \times$(the viewing history count)$+\gamma \times$(the favorites count) where $\alpha$, $\beta$, and $\gamma$ are predetermined weighting coefficients and $\alpha > \beta > \gamma$;
calculating a weighted addition value by an expression $c = S \times$(the first value)$+T \times$(the degree of use), where $S$ and $T$ are predetermined weighting coefficients;
determining whether all of lower categories below the target category is to be displayed or not based on the weighted addition value and a degree of difference between the first value and the second value;
controlling displays to display all of the categories below the target category, based on the determination;

wherein, in the weighted addition of the first value and the degree of use, the weighting coefficient T is larger when the purchase history count, the viewing history count, or the favorites count out of the objects that belong to the target category is larger; and
wherein the weighting coefficient S becomes smaller as the weighting coefficient T becomes larger.

12. A non-transitory computer-readable information storage medium storing a plurality of instructions, wherein when executed by at least one processor, the plurality of instructions cause the at least one processor to:
obtain, based on a search criteria input by a user, a plurality of objects that are found as a result of a search with respect to a target category that is one of a plurality of categories which have a tree structure comprising a plurality of hierarchy levels and to each of which one or more objects belong;
calculate, in a first search, one of (a) a first value which is the proportion, to a count of lower categories below the target category, of a count of lower categories which are below the target category and to each of which a count of found objects belongs exceeds a given cutoff threshold; (b) a first value which is the proportion, to a count of lower categories below the target category, of a count of lower categories which are below the target category and to each of which a ratio of a count of found objects belongs divided by a count of found objects belongs to the target category exceeds a given cutoff ratio; and (c) a first value which is variance of a count of found objects among the plurality of categories below the target category;
calculate, in a second search which is previous to the first search, one of (a) a second value which is the proportion, to a count of lower categories below the target category, of a count of lower categories which are below the target category and to each of which a count of found objects belongs exceeds a given cutoff threshold; (b) a second value which is the proportion, to a count of lower categories below the target category, of a count of lower categories which are below the target category and to each of which a ratio of a count of found objects belongs divided by a count of found objects belongs to the target category exceeds a given cutoff ratio; and (c) a second value which is variance of a count of found objects among the plurality of categories below the target category;
calculate, for the target category, a purchase history count based on a purchase history of the user; calculate, for the target category, a viewing history count based on a viewing history indicating objects of which details are output by detail displaying to the user; calculate, for the target category, a favorites count based on a favorites list in which objects are registered to be viewed later by the user;
calculate a degree of use by an expression $\alpha \times$(the purchase history count)$+\beta \times$(the viewing history count)$+\gamma \times$(the favorites count) where $\alpha$, $\beta$, and $\gamma$ are predetermined weighting coefficients and $\alpha > \beta > \gamma$;
calculate a weighted addition value by an expression $c = S \times$(the first value)$+T \times$(the degree of use), where $S$ and $T$ are predetermined weighting coefficients;
determine whether all of lower categories below the target category is to be displayed or not based on the weighted addition value and a degree of difference between the first value and the second value;
control displays to display all of the categories below the target category, based on the determination;

wherein, in the weighted addition of the first value and the degree of use, the weighting coefficient T is larger when the purchase history count, the viewing history count, or the favorites count out of the objects that belong to the target category is larger; and wherein the weighting coefficient S becomes smaller as the weighting coefficient T becomes larger.

13. The information processing device according to claim 3, wherein the degree of use is calculated based on objects of which details are output by the detail displaying to the user; objects purchased by the user; and objects registered in a list of objects that are to be viewed later by the user, out of objects that belong to the target category and that have fewer reviews written by other users than a review count threshold.

14. The information processing device according to claim 9, wherein the degree of use is calculated for each of a plurality of target categories that are on one of the plurality of hierarchy levels based on an input from the user, and wherein in the controlling, the display is allowed to display all categories below each target category for which the weighted addition value with respect to the lower categories is estimated to be equal to or more than a given degree, and forbids the display to display categories below each target category for which the weighted addition value with respect to the lower categories is estimated to be less than the given degree.

15. The information processing device according to claim 1, wherein a process of the calculating for one of the categories below the target category as a new target category is called recursively.

* * * * *